Dec. 1, 1953 H. E. ALTGELT 2,660,853
BEET TOPPER
Filed Oct. 7, 1949 4 Sheets-Sheet 3
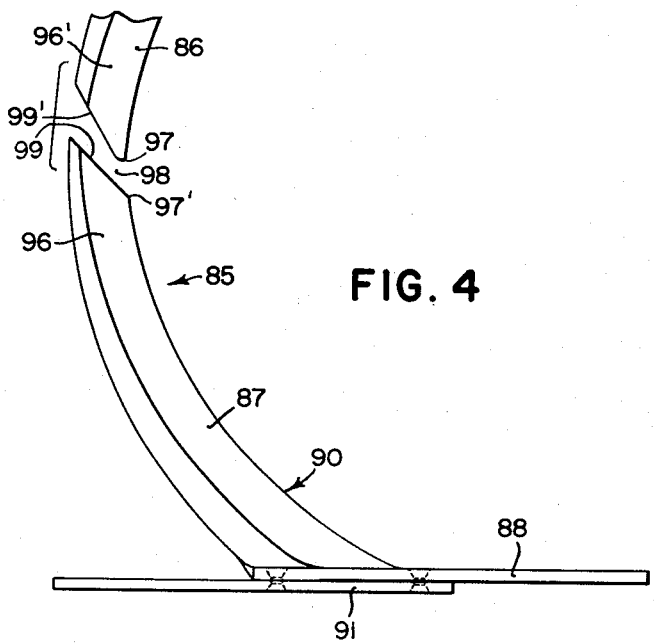
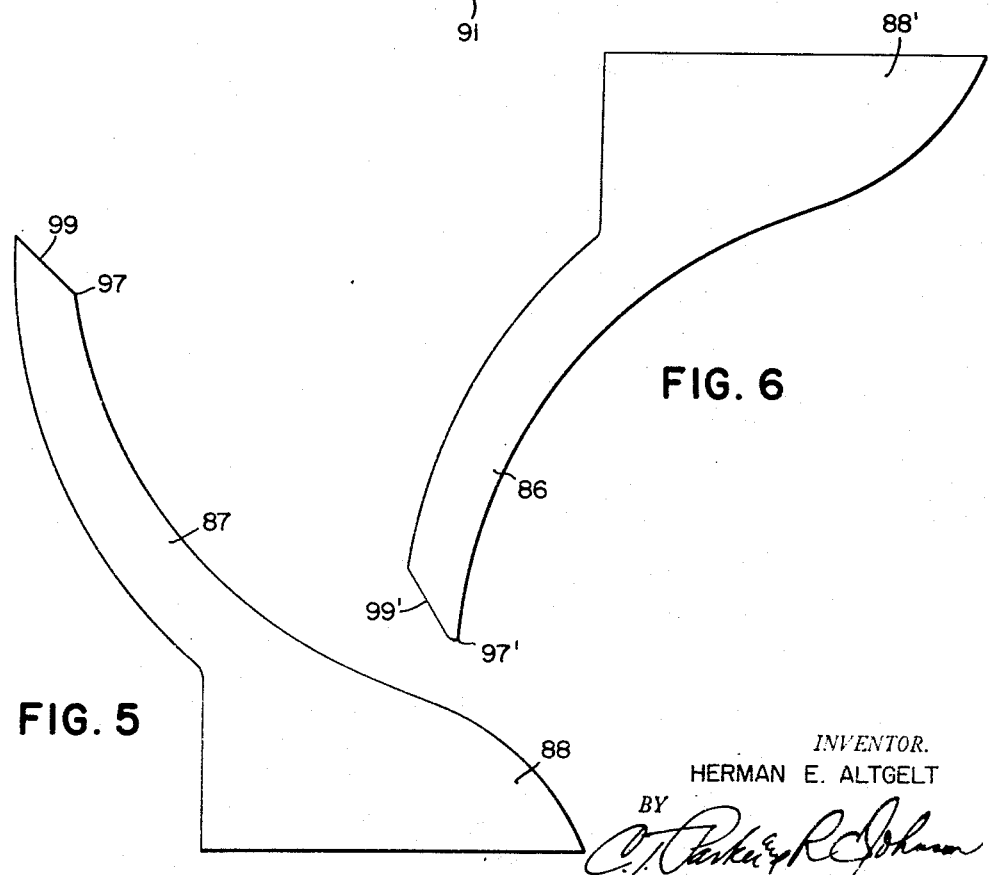
INVENTOR.
HERMAN E. ALTGELT
BY
ATTORNEYS Patented Dec. 1, 1953

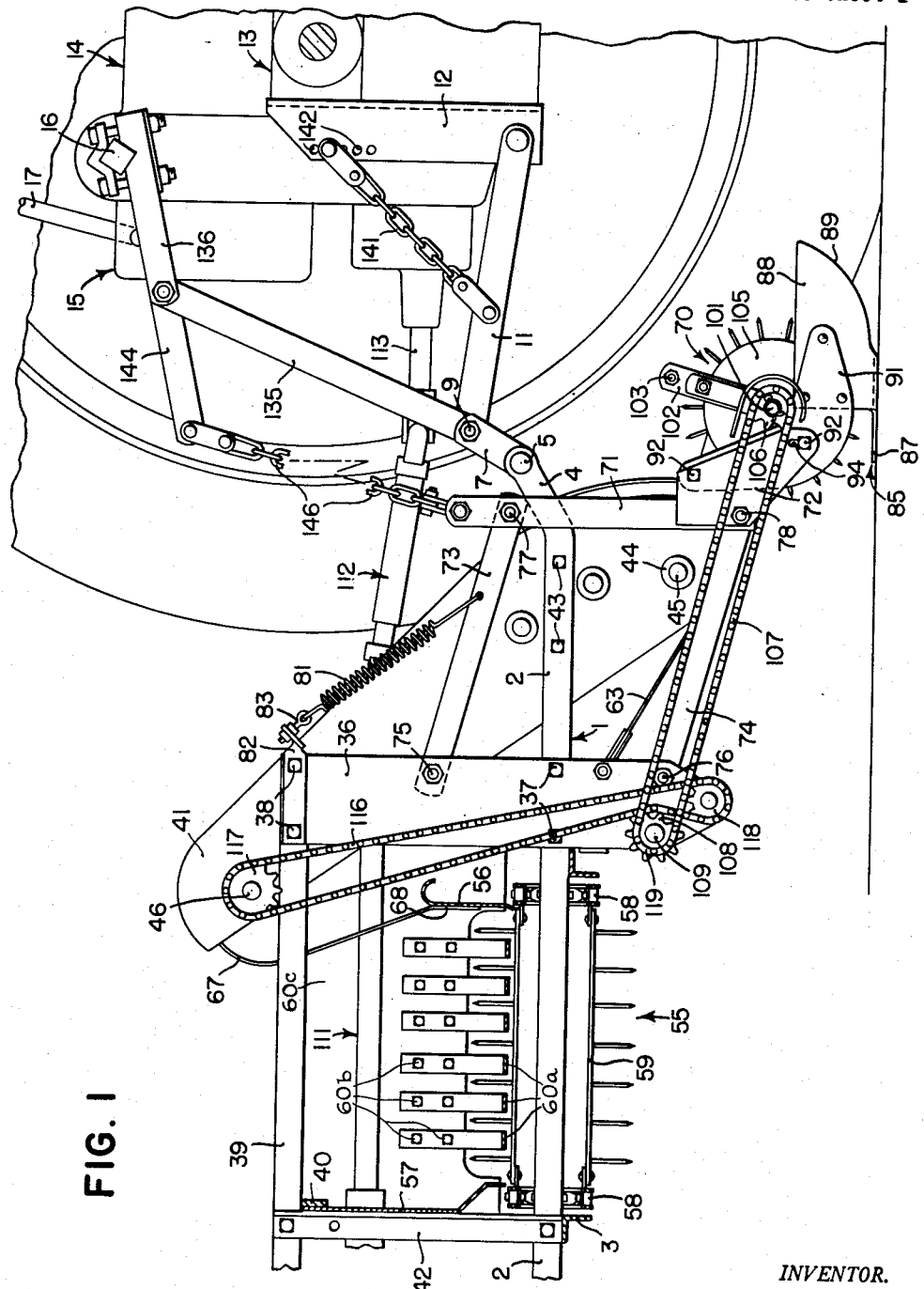

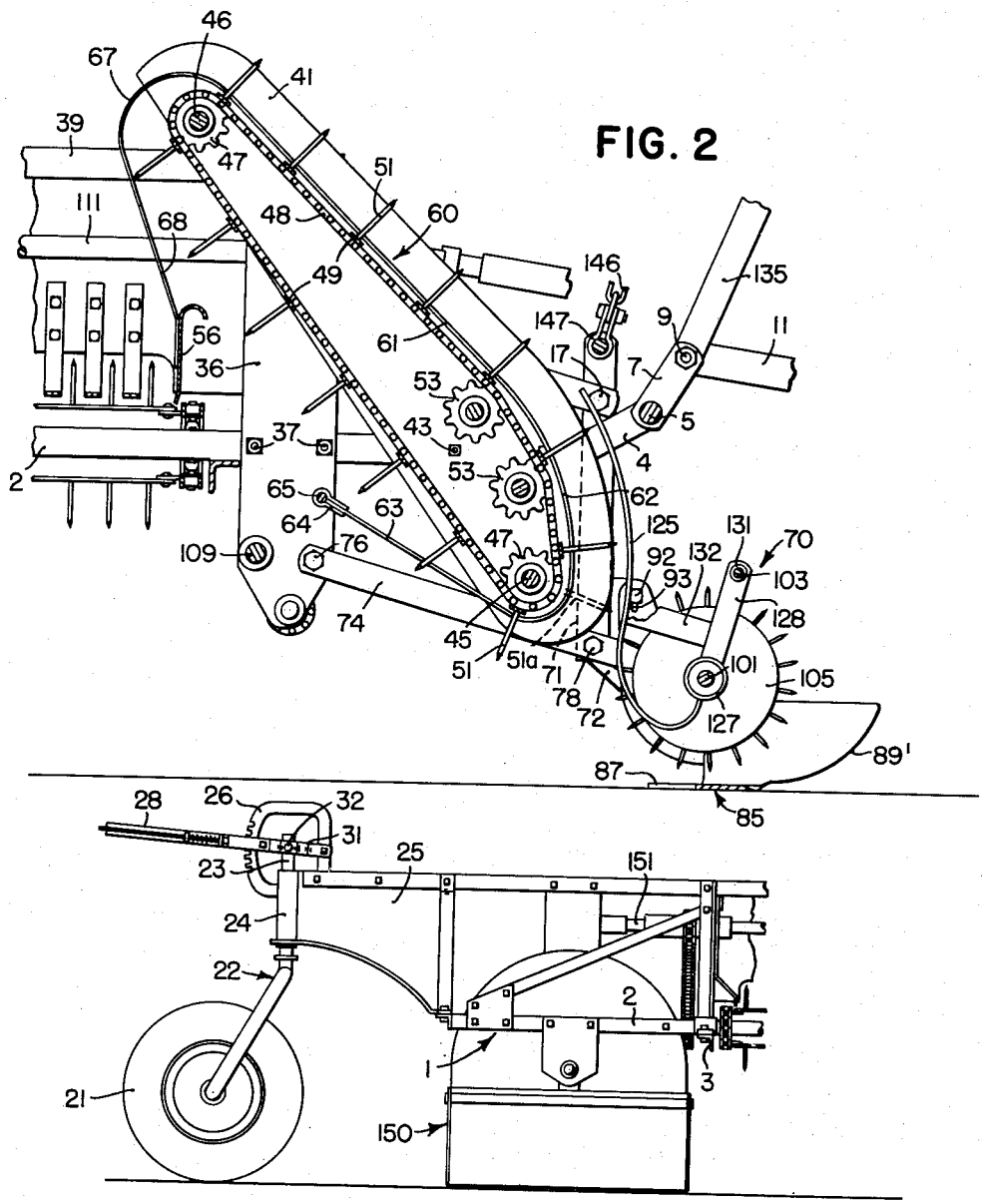

2,660,853

UNITED STATES PATENT OFFICE 2,660,853

BEET TOPPER

Herman E. Altgelt, Moline, Ill., assignor to Deere & Company, Moline, Ill., a corporation of Illinois Application October 7, 1949, Serial No. 120,114

9 Claims. (Cl. 56—121.45)

1

The present invention relates generally to agricultural implements and more particularly to harvesters for harvesting root crops, such as sugar beets, in which one preferred way of harvesting is to cut off the foliage and a small portion of the beet crown before digging the beets from the ground.

The object and general nature of the present invention is the provision of a new and improved topper for removing the tops from the beets while they are still in the ground. More specifically, a further feature of this invention is the provision of a topping device in which top-severing means is movable vertically under the control of a finder unit which passes along the row and rises and falls in response to the passage of the unit over larger or smaller beets. More particularly, it is a feature of this invention to provide means whereby the cut tops are picked up and delivered to a point of discharge.

A further important feature of this invention is the provision of means whereby the finder unit includes parts which also function as a part of the top-handling means whereby the construction is simplified and the cost of the machine is materially reduced. Still further, another feature of this invention is the provision of means facilitating the movement of the tops from the finder means over onto the conveyor which moves the tops away from the machine.

These and other objects and advantages of the present invention will be apparent to those skilled in the art after a consideration of the following detailed description, taken in conjunction with the accompanying drawings.

In the drawings:

Figure 1 is a side view of a beet topper with parts removed in which the principles of the present invention have been incorporated.

Figure 2 is a sectional view with parts removed, taken along a generally vertical, fore and aft extending plane, showing the top holddown means carried by the finder unit and movable relative to the lower forward end of the top elevator.

Figure 3 is a side view of the rear portion of the machine shown in Figure 7.

Figure 4 is an enlarged detail view of the topping knife unit.

Figures 5 and 6 show the knife lengths from which the right- and left-hand knife sections are formed.

Figure 7:
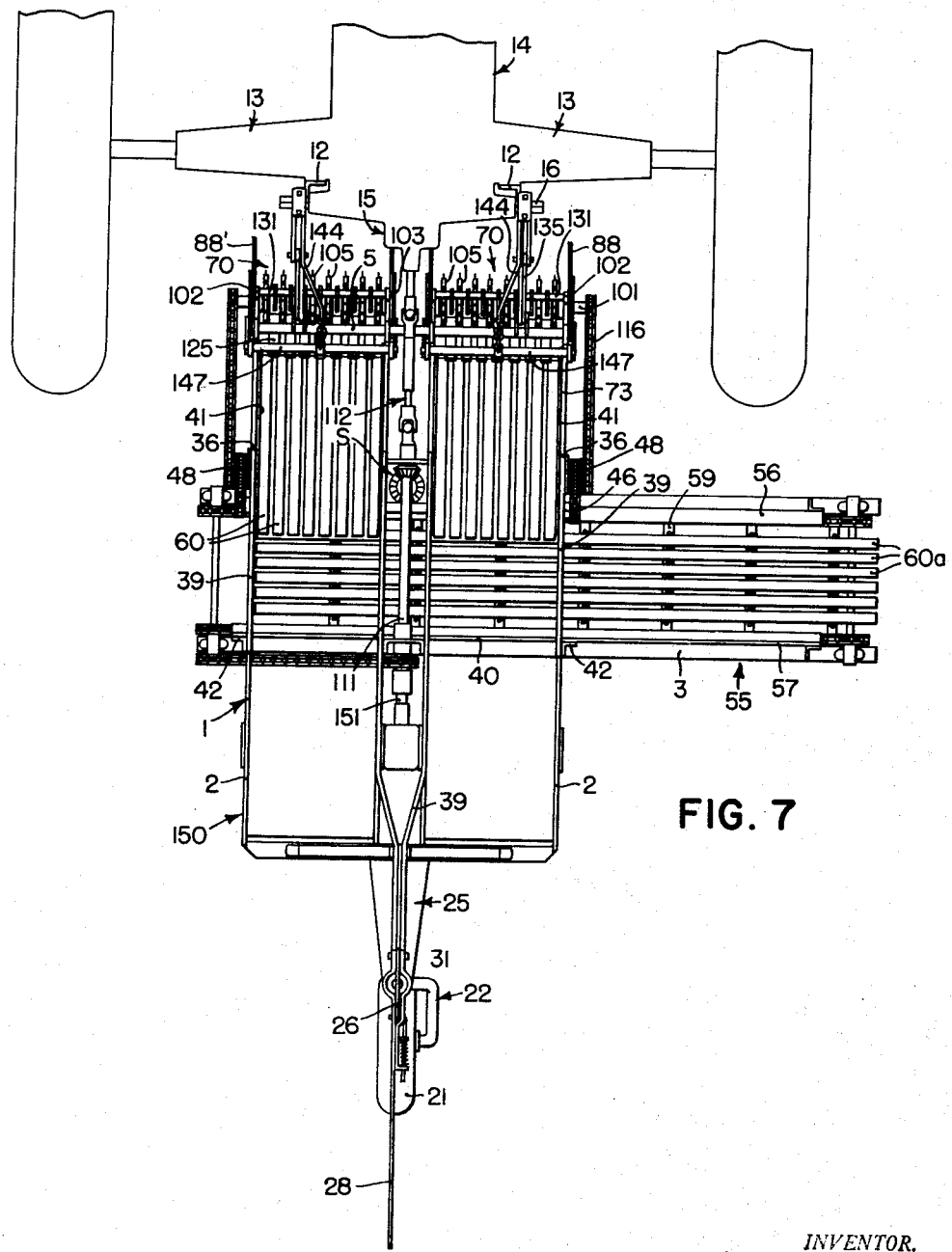
Figure 7 is a plan view drawn to a smaller scale of the harvester shown in Figures 1 and 2.

Referring now to the drawings, particularly Figure 1, the frame of the beet topper is indicated

2 in its entirety by the reference numeral 1 and includes a pair of generally fore and aft extending frame bars 2 connected together at their rear ends by a rear frame angle 3 and including upwardly and forwardly bent sections 4 at the forward ends of which a crossbar in the form of a round shaft member 5 is connected. Two pairs of apertured lugs 7 are secured, as by welding, to the forward crossbar 5, the lugs being apertured to receive pivot means 9 by which a pair of draft links 11 are connected to the forward portion of the frame 1. The forward ends of the draft links 11 are connected to draft brackets 12 which are adapted to be secured to a rear axle 13 of a propelling tractor, which is indicated in its entirety by the reference numeral 14. The latter is of conventional construction, so far as the present invention is concerned, and is of the type having a power lift device 15 which includes a transverse power-operated rockshaft 16 and a control therefor, including a valve lever 17, whereby the rockshaft 16 may be rocked by the power of the tractor for the purpose of raising and lowering tools and other units connected to the tractor. The rear end of the frame 1 is supported on a ground-engaging means in the form of a caster wheel 21 secured to the lower end of a caster wheel axle member 22 the upper spindle portion 23 of which is disposed in a vertical bearing sleeve 24 which forms a part of a bearing bracket 25 secured to the rear end of the frame 1 in any suitable way. A sector 26 is fixed to the bracket 25 and pivotally receives a hand lever 28 which includes conventional detent mechanism cooperating with the sector 26 for locking the hand lever 28 in different positions of adjustment. The hand lever 28 includes a bifurcated section 31 to which a swivel member 32 is pivotally connected, the member 32 being conected to the upper end of the spindle section 23 of the caster wheel axle member 22, whereby changing the position of the lever 28 serves to raise and lower the rear end of the frame relative to the supporting caster wheel 21.

The frame 1 also includes a pair of vertical plates 36 fixed, as by bolts 37, at their lower portions to the forward portions of the frame bars 2. The plates 36 extend upwardly and at their upper ends are secured by bolts 38 to the forward end of upper fore and aft extending frame bars 39 which at their rear ends are interconnected by a crossbar 40 and by a pair of vertical bars 42 to the rear portions of the main frame bars 2.

A pair of rigid elevator sides 41 are connected by the bolts 38 to the frame 1 at the upper ends of the vertical plates 36, and the lower portions of the elevator side members are fixed by bolts 43 to the forward portions of the frame members 2. At its lower end each of the elevator side members 41 carries suitable bearing means 44 in which a lower elevator cross shaft 45 is journaled for rotation, and the upper ends of the elevator side members 41 carry similar bearing means receiving an upper shaft 46. Each of the shafts 45 and 46 carries a pair of sprockets 47 over which a pair of elevator chains 48 are trained. The elevator chains 48 carry a plurality of crossbars 49 on which toothed flights 51 are mounted. A pair of idler sprockets 53 are rotatably mounted on the elevator side members 41 so as to dispose the lower forward portions of the elevator chains and associated flights for movement in a predetermined path generally arcuate about an axis extending through the lowermost portions of the vertical frame plates 36, as will be explained in more detail below. The rear portions of the fore and aft extending frame bars 2 carry a transverse top conveyor unit 55 which includes rigid front and rear side members 56 and 57 fixed to the conveyor frame 1 and receiving therebetween a conveyor comprising conveyor chains 58 and toothed flights 59, which may be substantially like the elevator chains 48 and associated structure described above. Stripper bars are disposed between each row of elevator teeth 51, each stripper bar unit indicated by the reference numeral 60. Each stripper bar 60 comprises a strap member 61 shaped as best shown in Figure 2 with a forward curved section 62, a lower upwardly extending section 63 fixed by connecters 64 to a crossbar 65 carried by the frame plates 36, and an upper curved stripping section 67 terminating in a downwardly and forwardly extending section 68 which is fixed in any suitable manner to the forward conveyor side member 56, as by bolts or the like. Stripper bars 60a, similar to the stripper bars 60 just described, are carried by or form a part of the conveyor unit 55 and are disposed between the teeth of the conveyor flights 59, as best shown in Figures 1 and 7. At one end each of the bars 60a are fixed, as at 60b, to the end sheet 60c of the conveyor 55.

As best shown in Figures 1 and 2, connected to the forward frame plates 36 is a beet topper and finder wheel unit indicated in its entirety by the reference numeral 70. This unit includes a pair of vertical knife shanks 71, each carrying a generally triangular plate 72 at its lower end. Each shank 71 is connected to the frame 1 by upper and lower links or arms 73 and 74 pivotally connected, as at 75 and 76, to the associated vertical frame plate 36 and at 77 and 78 to the associated shank 71. The pivot points are arranged so that the links 73 and 74 remain in substantially parallel position while permitting the topping and finder wheel unit 70 to shift in a generally vertical direction relative to the frame 1. A counterbalancing spring 81 is connected at its lower end to each of the upper links 73 and is connected at its upper end to a bracket 82 by an adjusting eyebolt 83. The bracket 82 is fastened to the frame 1 by the bolts 38.

As best shown in Figure 4, a topping knife unit 85 is fixed to the lower portions of the knife shank plates 72. The topping knife unit 85 comprises a pair of knife sections 86 and 87 of generally arcuate formation and each including an upturned portion formed with a sled runner front end and secured, as by rivets or the like, to a generally L-shaped attaching plate 91 which is apertured to receive a pair of attaching bolts 92 which fixes the associated knife section to its knife shank 71. The upturned portion of the right-hand knife section 87 is indicated at 88 in Figures 1, 4 and 5, and the sled runner front end is indicated by the reference numeral 89 in Figure 1. The upturned portion of the left-hand knife section 86 is shown at 88' in Figure 6. In Figure 2, the sled runner front end of the left-hand knife section 86 is shown at 89'. Preferably, the upper bolt-receiving aperture in each attaching plate 91 is slotted, as at 93, and the lower bolt-receiving aperture in each knife shank plate 72 is also slotted, as indicated at 94, thereby providing for generally vertical adjustment of the associated knife section.

As best shown in Figure 4, each of the knife sections 86 and 87 extends rearwardly and laterally inwardly from the associated bracket section 88 at a fairly small angle, as indicated at 90, but at the points where the knife sections approach one another, the end portions of the knife sections are fairly narrow and are disposed substantially at right angles to the line of advance, these generally transverse portions of the knife sections being indicated by the reference numerals 96 and 96'. The ends 96 and 96' are shaped as shown in Figure 4, being curved as indicated at 97 and 97' at the forward corners, forming a fairly narrow throat 98. Rearwardly of the throat 98 the ends 96 and 96' of the knife sections taper rearwardly, diverging rearwardly from the throat 98. The rearwardly diverging edges 99 and 99' facilitate the passage of trash and the like rearwardly from the throat 98, the forward curved sections 97 and 97' facilitating the passage of trash and the like through the space between the ends of the knife sections. The trash, such as streamers, leaves and the like, are directed generally towards the throat 98 by virtue of the forward portions 90 of the blade sections, which, making a fairly small angle with respect to the direction of travel, serve as means for guiding the trash and the like toward the space between the knife ends. Yet, by virtue of the knife end sections 96 and 96' being generally transversely disposed with respect to the direction of travel, the knife passes rapidly through the crown portion of the beets being topped and without tending to cause the beets to break and without interfering with the up-and-down movement of the knife sections under the control of beet-crown-engaging finder wheels described below. Trash and the like do not tend to hang onto the transverse portions of the knife sections because the passage of the knife sections through the body of the beet tends to remove any trash that otherwise might tend to remain on the ends of the knife sections. Those portions of the knife sections which ordinarily are not contacted by the beet bodies are, as mentioned above, disposed at a fairly small angle, as indicated at 90, with respect to the direction of travel of the machine, and hence trash does not tend to hang onto these portions of the knife sections.

The lower links 74 of the parallel link structure 73, 74, connecting the unit 70 to the frame of the machine, constitute a finder wheel frame and are extended forwardly to provide bearing means in which a finder wheel shaft 101 is mounted for rotation, the forward portions of the links 74 then being extended upwardly, as at 102, and apertured to receive a transversely disposed bolt member 103. A plurality of toothed finder wheels 105 are fixed to the shaft 101 between the forward portions of the links 74. The outer end of the shaft 101 carries a sprocket pinion 106 which is driven by a chain 107. The rear portion of the latter is trained over a sprocket pinion 108 fixed to a drive shaft 109 supported for rotation in the lower portions of the forward frame plates 36. The shaft 109 is driven in any suitable way, as by a vertical shaft and a pair of bevel gear sets S, from a fore and aft extending drive shaft 111 which, in turn, is driven by a telescopic shaft unit 112 from the power take-off shaft 113 of the tractor. The shaft 46 at the forward upper portion of the frame 1, which drives the elevator chains 48, is driven by a chain 116 which is trained at its upper end over a sprocket 117 fixed to the outer end of the shaft 46 and at its lower end over an idler sprocket 118 which disposes the chain 116 in driving engagement with a driving sprocket 119 fixed to the drive shaft 109.

The finder wheels 105 are disposed just above the knife sections 86 and 87 and are arranged so that the teeth of the finder wheels engage the upper portions of the beet crowns, riding up on the upper or crown portion of each beet during the progress of the machine. The driving mechanism, including the sprockets and sprocket chains mentioned above, are so constructed and arranged that the finder wheels are driven slightly in excess of ground speed, whereby the finder wheels exert a positive effort to cause the knives to approach and top the beets by removing the leaves of the beet tops and a portion of the beet crown. In riding up onto and off of the beets the finder wheels cause the lower links 74 to swing generally vertically about an axis extending through the pivots 76, the upper links 73, being parallel to the lower links 74, partaking of the same movement. This serves to hold the knife shanks 71 in a vertical position, whereby the vertical movements of the knife sections 86 and 87 are somewhat less than the corresponding vertical movements of the finder wheels 105, the proportion of finder wheel movement to knife movement corresponding to the proportion of the distance from the pivots 76 to the shaft 101 with respect to the distance from the pivots 76 to the pivots 73. It will be seen from Figure 2 that the curved portions 62 of the stripper bars 61 are arcuate about the axis 76 as a center.

Stripper means is provided for the finder wheels 105 and, as best shown in Figure 2, comprises a plurality of arcuate stripper bar sections 125, the upper portions of these sections being arcuate about the axis 76 as a center, the lower portion of each finder wheel stripper bar or hold-down strap 125 being curved downwardly and forwardly with respect to the teeth of the finder wheels and then curved upwardly and fixed, as by welding, to a collar 127 which is disposed about the adjacent hub sections of the associated finder wheel. As will be clear from Figure 2, the upper portions of the several bars 125 serve to hold the tops, stripped from the finder wheels 105 by the lower portions of the bars 125, against the teeth 51 as the latter move around the curved sections 62 of the stripper bars 60. Also secured to each of the collars 127 is a bracket 128, the upper ends of which are apertured to receive the bolt 103. The latter member carries a plurality of bushings 131 disposed between the upper ends of the several brackets 128, whereby when the bolt 103 is tightened, the several stripper bar brackets 128 are securely fixed in position, one relative to the other and also relative to the upwardly extending end portions 102 of the links 74. Rearwardly extending bracket sections 132 are fixed to the brackets 128 and at their rear ends are fixed, as by welding, to the lower portions of the curved finder wheel stripper bars 125.

The finder wheel stripper bars 125 function to strip the tops, cut off by the knife sections 86 and 87, from the finder wheel teeth and guide them into a position where they are engaged by the teeth 51 of the conveyor 60. Since the stripper bars 125 are arcuate about the axis 76 as a center, up-and-down swinging movement of the finder wheel structure relative to the elevator 60 does not cause any variation in the spacing between the stripper bars 125 and the associated elevator chains, the idler sprockets 47 and 53 disposing the adjacent portions of the chains also in a position which is generally arcuate about the axis 76 as a center, corresponding to the curvature of the adjacent stripper bar sections 62 of the elevator stripper bars 61.

The front end of the topper frame 1 is raised and lowered about its rear wheel support 21 by means of a pair of links 135 which are connected at their lower ends to the cross-bar 9 and at their upper ends to arms 136 that are fixed to the tractor power lift rockshaft 16. The lower position of the front end of the frame 1 is determined by a chain 141 which is connected at its upper end, at any one of a plurality of points 142, to the upper portion of the associated bracket 12, the chain 141 being connected at its lower end to the associated draft link 11, as best shown in Figure 1. An auxiliary arm member 144 is also fixed adjacent its forward end to the power lift rockshaft 16 on the tractor and is extended rearwardly beyond the rear end of the lifting arm 136. The rear end of the auxiliary arm member 144 is connected by a chain 146 to the upper ends of the knife shanks 71 by any suitable means, such as a cross shaft 147. Normally, the chain 146 is slack so that up-and-down movements of the finder wheel and topping knife unit are accommodated, under the control of the driven finder wheels 105. However, when it is desired to raise the topper into an inoperative or transport position by upward movement of the lifting arms 136, the longer auxiliary arms 144 take up the slack in the chain 146 and then raise the finder wheel and topping knife unit to a distance greater than the distance to which the front end of the frame is raised by operation of the lifting arms 136. This elevates the finder wheels and knives to such a position that they do not tend to catch trash and the like during transport of the machine from one field to another, along lanes and the like. In one form of the invention the ratio of finder wheel movement to knife movement is approximately four to three.

It will be noted from Figure 2 that the teeth or prongs of the conveyor chains 48 move at a fairly uniform rate along an arcuate path, arcuate about the axis 76 as a center, from the lower idler sprockets 47 to the upper idler sprockets 53 while the prongs 51, where they are swung around the axis of the lower idlers 47 at the lower end of the elevator, move with a rapidly accelerated movement but that this accelerated movement is substantially terminated at about the point where the teeth 51 engage the beet tops stripped off by the lower portions of the curved finder wheel stripper bars 125. This results in a fairly uniform movement of the tops beginning at about the tooth position indicated at 51a in dotted lines in Figure 2 where the ends of the points begin to approach and move along the arcuate finder wheel stripper bar sections 125.

The tops conveyed upwardly by the elevator 60 are delivered by the stripper bar sections 67 into the transverse conveyor 55. Rearwardly of the latter unit I provide a beet crown scarifying unit indicated in its entirety by the reference numeral 150 (Figure 3) which is supported by the rear portion of the frame 1 and driven by a suitable extension 151 of the power shaft 111 (Figure 1). Preferably, the unit 150 is in the form of a beater which serves the purpose of cleaning off dirt, leaves and the like from the upper cut ends of the beet bodies, whereby in the subsequent operation of lifting and harvesting the beets the beet row may readily be seen by the operator of the subsequent machine. However, the present invention is not concerned with the particular details per se of the unit 150.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A beet topper comprising a frame, a vertically adjustable topping knife, a generally vertically adjustable finder wheel unit interconnected with said topping knife for varying the position of the latter, said finder wheel unit including one or more pronged top-engaging wheels, means for rotating the latter to engage the beet tops removed by said topping knife, conveyor means for receiving the tops from said finder wheel unit and including conveyor chains having top-engaging fingers the outer ends of which, at the lower forward part of said conveyor means, extend forwardly toward and pass relatively close to the prongs on the adjacent portions of the top-engaging wheels of the finder wheel unit so as to pick up beet tops from said finder wheel unit, and means rotatable about an axis parallel to the axis of said finder wheels for supporting the forward portions of said conveyor chains.

2. In a beet topper, a frame, an arm pivoted thereto for generally up and down swinging about a generally transverse axis, beet-engaging finder means carried at the outer end of said arm, a topping knife connected to be positioned by said arm, and top-engaging and conveying means carried by said frame and including a portion adjacent said finder means movable in a path that is generally arcuate about said axis as a center.

3. In a beet topper, a frame, an arm pivoted thereto for generally up and down swinging about a generally transverse axis, top pick-up means carried at the outer end of said arm, and top-engaging and conveying means carried by said frame and including a portion adjacent said top pick-up means and movable in a path that is generally arcuate about said axis as a center.

4. In a beet topper, a frame, an arm pivoted thereto for generally up and down swinging about a generally transverse axis, top pick-up means carried at the outer end of said arm, top-engaging and conveying means carried by said frame and including a portion adjacent said top pick-up means and movable in a path that is generally arcuate about said axis as a center, and top hold-down means carried by said arm and having parts disposed closely adjacent said arcuate portion of the top-engaging and conveying means and extending in concentric relationship with said arcuate portion about said axis as a center.

5. In a beet topper, a main frame, a finder wheel frame pivoted to the main frame for generally up and down movement about a generally transverse horizontal axis, a plurality of pronged finder wheels rotatably carried at the outer portion of said finder wheel frame, a topping knife disposed adjacent the lower portions of said finder wheels and connected with said finder wheel frame to be positioned by said finder wheels, means for driving said finder wheels, a top-engaging and conveying means carried by said main frame in stationary relationship relative to said finder wheel frame and including a portion movable in a generally circular path about said axis as a center, and top hold-down straps fixed to said finder wheel frame and having portions curved and extending in concentric relationship about said axis as a center.

6. A beet topper adapted to be connected to the rear of a tractor having a power lift device, said beet topper comprising a frame, draft means for connecting the frame to the tractor, ground-engaging means supporting the rear end of said frame, means including an arm connectible with the power lift device and with the front end of the topper frame for supporting the front end of said topper frame, movement of said power-lift-actuated arm serving to raise and lower said frame, a topping knife movably carried by said frame, a beet-engaging finder unit interconnected with said knife for controlling the position of the latter, and an extension on said arm connected with said knife and finder unit for raising them concomitantly with but farther than the front end of said frame is raised by the operation of said power lift device.

7. A beet topper adapted to be connected to the rear of a tractor having a power lift rockshaft and an arm fixed thereto, said beet topper comprising a frame adapted to be connected at its front end with the tractor, ground-engaging means supporting the rear end of said frame, generally vertically extending link means for connecting the front end of said frame with said power lift arm, movement of said power-lift-actuated arm serving to raise and lower said frame, a topping knife movably carried by said frame, a beet-engaging finder unit interconnected with said knife for controlling the position of the latter, and for connecting said knife and finder unit with said power lift arm at a point outward of said link means for raising said knife and finder unit concomitantly with but farther than the front end of said frame is raised by the operation of said power lift rockshaft and arm.

8. In a beet topper, a frame, an arm pivoted thereto for generally up and down swinging about a generally transverse axis, top pick-up means carried at the outer end of said arm beyond said frame, a pair of curved members supported by said frame adjacent said top pick-up means, the curved portions of said members being arcuate about said transverse axis, and top-engaging and conveying means carried by said frame and movable along said curved members so as to pass adjacent said top pick-up means.

9. A beet topper adapted to be connected to the rear of a tractor having a power lift device, said beet topper comprising a frame, draft means for connecting the frame to the tractor, ground-engaging means supporting the rear end of said frame, means including an arm connectible with the power lift device and with the front end of the topper frame for supporting the front end of said topper frame, movement of said power-lift-actuated arm serving to raise and lower said frame, a topping knife movably carried by said frame, a beet-engaging finder unit interconnected with said knife for controlling the position of the latter, a member connected to move with said arm by the operation of said power lift device, said member having an end movable through a distance greater than the distance through which said arm moves, and means connecting said end of said member with said knife and finder unit for raising them concomitantly with but farther than the front end of said frame is raised by the operation of said power lift device.

HERMAN E. ALTGELT.

References Cited in the file of this patent

UNITED STATES PATENTS

| Number | Name | Date |
|---|---|---|
| 25,312 | Aylesworth | Sept. 6, 1859 |
| 951,476 | King | Mar. 8, 1910 |
| 999,381 | Lotter | Aug. 1, 1911 |
| 1,113,944 | Auble | Oct. 20, 1914 |
| 1,220,977 | Goulet | Mar. 27, 1917 |
| 1,366,477 | Moreschini | Jan. 25, 1921 |
| 1,369,721 | Wilson | Feb. 22, 1921 |
| 1,376,461 | Prose | May 3, 1921 |
| 1,831,658 | Groenig | Nov. 10, 1931 |
| 2,364,312 | Patterson | Dec. 5, 1944 |